INVENTOR.
RANDOLPH SAMUEL RAE,
ATTORNEY

United States Patent Office 2,922,286
Patented Jan. 26, 1960

2,922,286

PRODUCTION OF LIQUID OXYGEN

Randolph Samuel Rae, Santa Monica, Calif., assignor to The Garrett Corporation, Los Angeles, Calif., a corporation of California Application August 13, 1954, Serial No. 449,702

12 Claims. (Cl. 62—11)

This invention relates to a method and apparatus for producing liquid oxygen from atmospheric air and more particularly to a method and apparatus for producing liquid oxygen to be utilized as the oxidant for a non-air breathing engine utilized to propel a vehicle, such as an aircraft.

Non-air breathing engines of the type disclosed in pending U.S. patent application Serial No. 417,867 filed March 22, 1954, by Randolph Samuel Rae and entitled "Non-Air Breathing Engines" can utilize low temperature liquids as the fuel and oxidant. When such engines are utilized for propelling vehicles, such as aircraft, the liquid fuel and liquid oxidant can be carried in separate tanks within the vehicle and such tanks are supplied with sufficient amounts of the liquid substances to propel the vehicle for the required time. When the engine is used to propel an aircraft, it is obvious that unnecessary weight could be eliminated if the liquid oxidant were produced continually throughout the flight.

By the present invention, it is proposed to produce the liquid oxygen continuously throughout the flight of the aircraft so that only the amount of oxygen needed to maintain the flight of the aircraft will be carried by the aircraft. In order to produce the liquid oxygen, air is taken from the atmosphere and passed through heat exchanger units so that the air temperature can be reduced sufficiently to liquify the oxygen in the air. The heat exchanger units are connected with the low temperature liquid fuel supply, such as hydrogen, with the liquid oxygen supply and with the cold nitrogen gas resulting from the continuous liquification of the oxygen in the air. In one modification of the invention a compressor is utilized to increase the pressure of the air being liquified so that the liquification temperature of the oxygen can be increased when low atmospheric pressures are encountered at high altitudes. By thus compressing the air, less liquid hydrogen is needed to liquify the oxygen from the air.

While liquid hydrogen is the preferred fuel, it is understood that other low temperature fuels can replace the liquid hydrogen providing, of course, that the temperature of these other fuels is sufficiently below the liquification temperature of the oxygen. The type of engines which utilize low temperature fuels and oxidants are those which are satisfactory for underwater and high altitude operation where practically no air is available for the combustion of fuel in an internal combustion engine.

It is therefore an object of the present invention to provide an oxidant supply for an engine which supply is continually produced by liquifying the oxygen in the atmosphere air.

Another object of the present invention is to provide a method and apparatus for producing liquid oxygen as the oxidant for an engine, which method and apparatus utilizes a low temperature fuel supply for the engine to aid in liquifying oxygen from atmospheric air.

A further object of the invention is to provide a method and apparatus for producing liquid oxygen as an oxidant supply for an engine by utilizing low temperature liquid fuel, low temperature liquid oxygen and low temperature nitrogen gas, resulting from the liquification of oxygen, as the cooling medium.

A still further object of the invention is to provide a method and apparatus for liquifying oxygen in atmosphere air by increasing the air pressure in order to increase the temperature at which the oxygen will liquify.

These and other objects of the invention, not specifically set forth above, will become readily apparent from the accompanying description and drawings in which.

Figure 1:
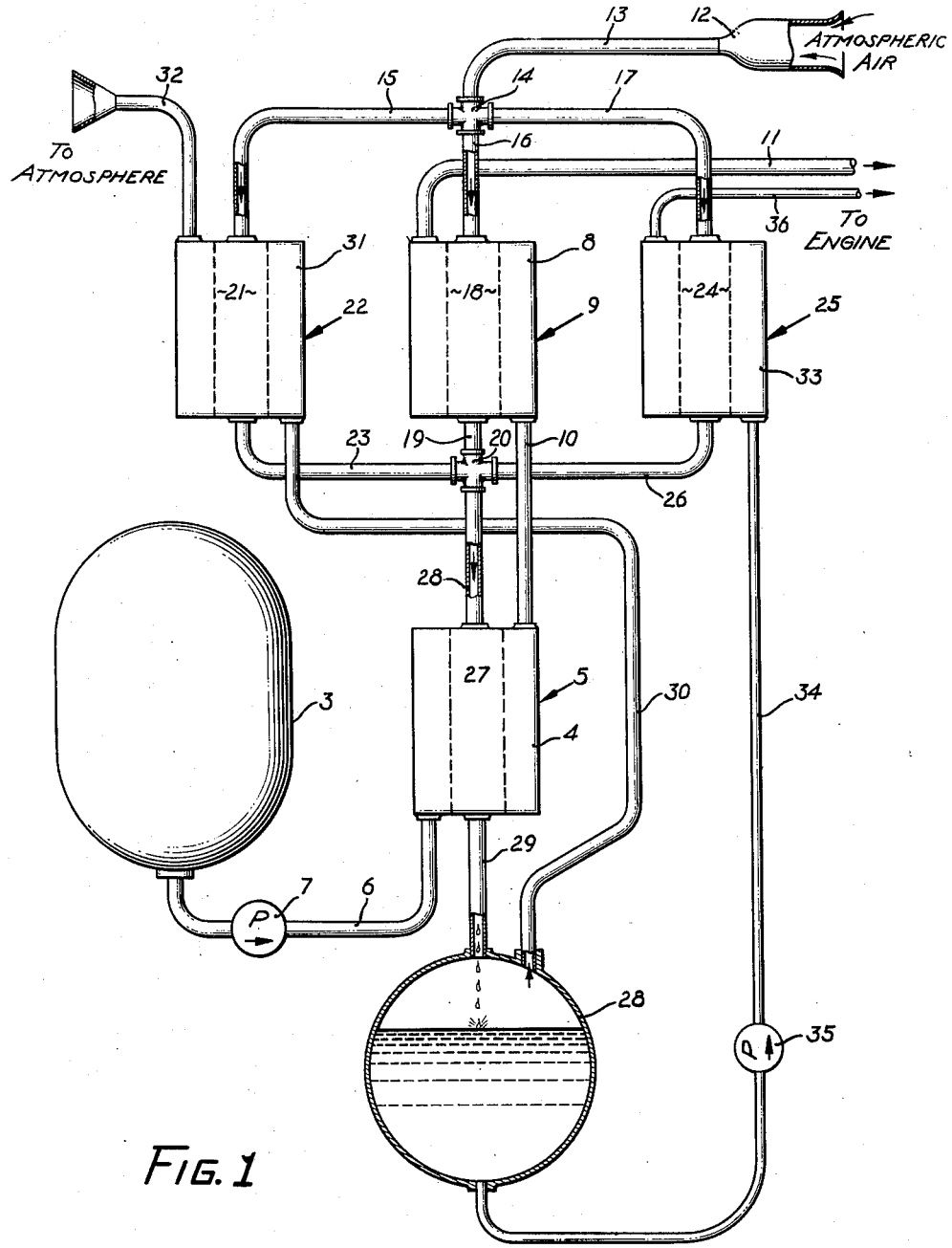
Figure 1 is a diagrammatic view of the first form of the invention showing the inlet for atmospheric air and the heat exchangers for producing liquid oxygen from the air.

Referring to the form of the invention shown in Figure 1, a tank 3 for low temperature liquid hydrogen fuel is shown connected to the outer chamber 4 of heat exchanger 5 through passage 6 and pump 7. Outer chamber 4 is connected to outer chamber 8 of heat exchanger 9 through a pasage 10 and outer chamber 9 connects with the engine (not shown) through the passage 11 in order to supply hydrogen gas to the engine 11a as fuel. It is understood that the hydrogen tank 3 can be mounted within any type of craft, such as an aircraft, and that the liquid hydrogen will be supplied to the tank prior to travel of the craft.

An airscoop 12 is mounted exteriorly of the mounting craft in the airstream so that it will receive atmospheric air. The airscoop connects through passage 13 and connection 14 with three passages 15, 16 and 17 so that the air taken in by the scoop will be divided between these three passages. Passage 16 connects with the inner chamber 18 of heat exchanger 9 and passage 19 connects the inner chamber 18 with a four way fitting 20. Passage 15 connects with the inner chamber 21 of heat exchanger 22 and this chamber 21 is also connected with four way fitting 20 by means of passage 23. In a similar manner, passage 17 connects to the inner chamber 24 of heat exchanger 25, and this chamber is connected to fitting 20 by passage 26. The heat exchanger 5 has an inner chamber 27 which is connected to fitting 20 by passage 28 so that all of the incoming air will pass through chamber 27, which discharges to oxygen tank 28 through a passage 29. The oxygen which has been cooled and liquified by passage through the various heat exchangers will collect in tank 28 and since the air temperature has not been decreased sufficiently to liquify the nitrogen in the air, the nitrogen will be discharged in gas form to tank 28. The low temperature nitrogen gas is led from the tank 28 through passage 30 to the outer chamber 31 of heat exchanger 22 and the outer chamber 31 exhausts the nitrogen gas to atmosphere through passage 32. Liquid oxygen from tank 28 is connected with outer chamber 33 of heat exchanger 25 through passage 34 and pump 35 and the outer chamber 33 discharges oxygen gas to the engine 11a through passage 36. It is understood that the hydrogen and oxygen in passages 11 and 36, respectively, leading to the engine are utilized as the fuel and oxidant respectively in order to drive the engine and that the engine can be any type of gas expansion engine, such as referred to in the previously mentioned patent application. Pump 7 serves to supply hydrogen to the engine through heat exchangers 5 and 9 and through passage 11 while pump 35 supplies oxygen to the engine through heat exchanger 25 and passage 36.

Referring now to the operation of the invention, the air entering scoop 12 will be passed through the inner chambers of heat exchangers 9, 22 and 25 and the air will be cooled within these heat exchangers. The heat exchanger 22 will cool the air from passage 15 by the cold nitrogen gas exhausting from tank 28 while the air entering heat exchanger 25 from passage 17 will be cooled by the cold oxygen being pumped to the engine. The portion of the air from passage 16 will be cooled by hydrogen which enters heat exchanger 9 from heat exchanger 5. Thus, the total air supply will be received by fitting 20 and passage 28 at a temperature below ambient temperature since the air leaving each of the heat exchangers will be cooled with the coldest temperature medium in the outer chamber of each heat exchanger. The cooling medium in each heat exchanger will be discharged at about the same ambient temperature as the air entering the units.

The cooled air in passage 28 will pass through heat exchanger 5 which has its outer chamber directly connected to the liquid hydrogen fuel supply and the air will be further cooled in heat exchanger 5 to the point where liquification of the oxygen in the air will take place. The discharge passage 29 from the heat exchanger 5 contains liquid oxygen and gaseous nitrogen, as well as other minor components of air, and passage 29 connects to tank 28 where the liquid oxygen will collect. Thus, the cold nitrogen gas is available as the cooling medium for heat exchanger 22 and the liquid oxygen is available for the oxygen supplied to the engine and for the cooling medium of heat exchanger 25. For the purposes of this invention, atmospheric air is considered to be composed of oxygen and nitrogen since the other components of air form a negligible percentage. Because of the work done on the liquid hydrogen by pump 7, the hydrogen will be in the gaseous phase and slightly above the liquification temperature of hydrogen when entering heat exchanger 5. The hydrogen gas discharged from heat exchanger 5 through passage 10 will, of course, be at a higher temperature than the gas entering the heat exchanger and will be at about the temperature of liquid oxygen. In the same manner, the temperature of the oxygen will be increased above the liquification temperature by the pump 35 and, of course, the oxygen temperature in passage 34 will be higher than the hydrogen temperature in passage 6. Since the discharge from heat exchanger units 9 and 25 is about ambient temperature the passages 11 and 36 will supply hydrogen and oxygen gas to the engine at about ambient temperature. Since the tank 28 is connected to atmospheric pressure through the various heat exchangers, the liquification temperature of the oxygen will, of course, vary with the atmospheric pressure of the surrounding air. The liquid hydrogen in tank 3 will be at atmospheric pressure so that the temperature of the liquid hydrogen will be maintained at the liquification temperature corresponding to atmospheric pressure. Also, the cold nitrogen gas which is at about the liquification temperature of oxygen will be discharged to atmosphere through passage 32 at about ambient temperature. From the above description, it is apparent that an apparatus and method has been described in which air can be taken from the atmosphere at atmospheric pressure and first cooled by the oxygen and hydrogen passing to the engine and by the nitrogen resulting from the liquification of oxygen from the air. The total air quantity is then further cooled to liquification temperature of the oxygen by a heat exchanger directly connected to the liquid hydrogen supply. Thus, liquid oxygen will be continually produced in sufficient quantity for the engine and it is unnecessary for excess oxygen to be carried by the craft.

Figure 2:
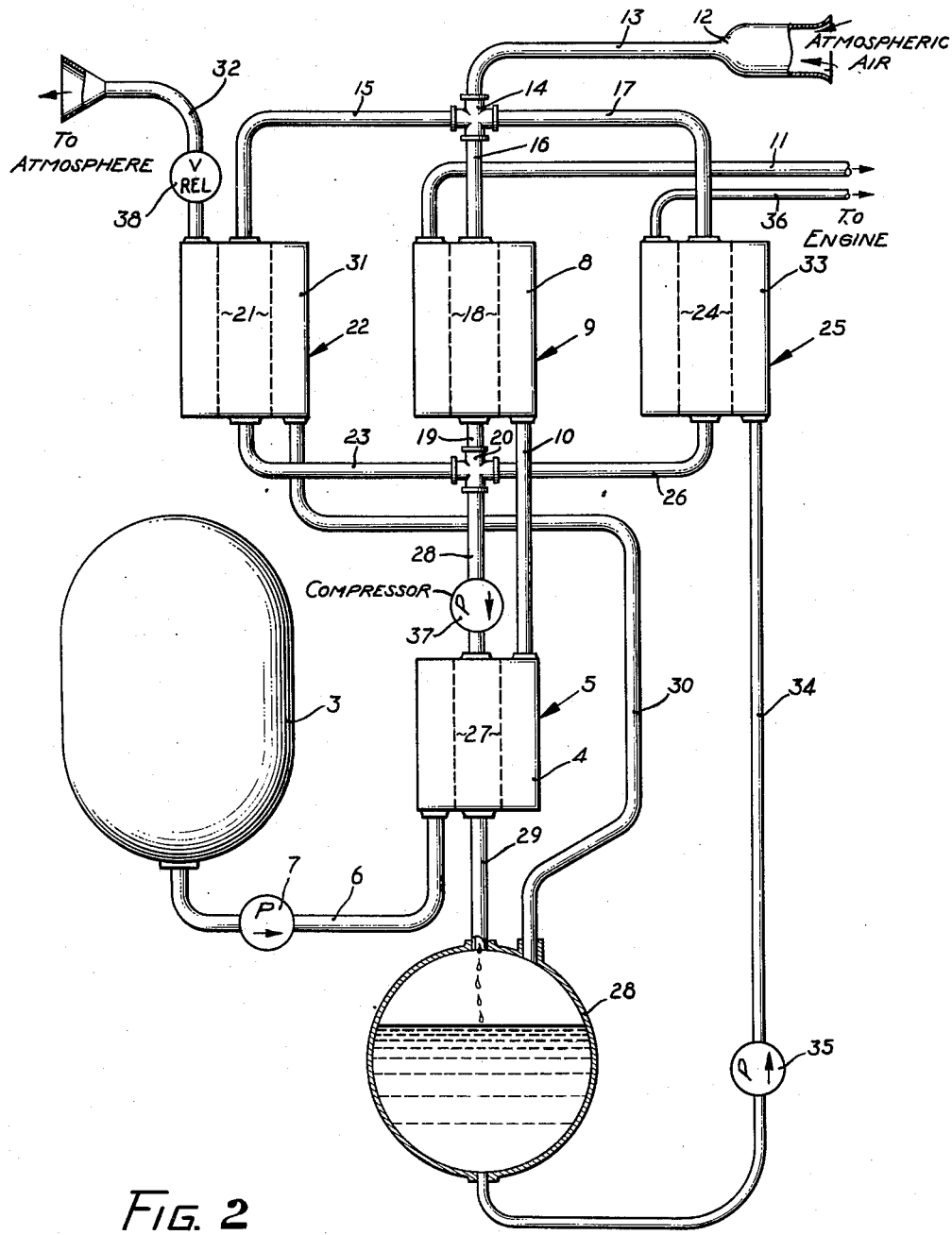
Figure 2 is a diagrammatic view of a second form of the invention wherein a compressor is utilized to increase the air pressure and thereby increase the liquification temperature of the oxygen in the air.

Referring to the second form of the invention shown in Figure 2, like numerals represent like parts as in the previous embodiment and this embodiment is substantially the same as the previous embodiment except that a compressor 37 is placed in passage 28 and a valve 38 is placed in passage 32. As the atmospheric pressure of the air decreases, as occurs upon increase in altitude, the liquification temperature of oxygen will likewise decrease. Thus, with the embodiment of Figure 1, it will take more liquid hydrogen to produce a given amount of liquid oxygen than at lower atmospheric pressures. In order to overcome this difficulty, the compressor 37 is utilized to raise the pressure of the air in passage 28 after it has been cooled by heat exchangers 9, 22 and 25, and this increase in pressure of the air will raise the liquification temperature of the oxygen in the air. Therefore, more liquid oxygen can be produced by a given amount of liquid hydrogen even though the compressor raises the temperature of the air somewhat. Since it is necessary to maintain this increased pressure in tank 28, a relief valve 38 is placed in line 32 in order to retain the pressure within the tank 28 and prevent a direct connection between the tank and atmosphere. This second form of the invention operates substantially in the same manner as the first form except for the fact that the pressure of the incoming air is increased to the point where the liquid hydrogen can produce the required amount of liquid oxygen. Of course, the valve 38 can be adjusted to regulate the pressure within tank 28.

By the present invention a novel method and apparatus has been provided which permits a craft to carry a liquid fuel supply and to produce an oxidant supply in the form of liquid oxygen from air taken from the atmosphere. It is understood that various other arrangements of heat transfer units are contemplated wherein the hydrogen and oxygen are passed to the engine at about ambient temperature and the resulting nitrogen is also discharged at about ambient temperature. Also various types of engines can be utilized in connection with the oxidant and fuel supply. Various other modifications are contemplated by those skilled in the art without departing from the spirit and scope of the invention as hereinafter defined by the appended claims.

What is claimed is:

1. A device for producing liquid oxygen from atmosphere air for use as an oxidant for an engine comprising a fuel tank for receiving a low temperature liquid hydrogen fuel, an oxygen tank for receiving the liquefied oxygen, an airscoop for obtaining a supply of atmospheric air, first and second heat exchangers connected in series between said fuel tank and said engine and utilizing said fuel as the cooling medium, said first heat exchanger being also connected with said air-scoop for precooling a portion of said incoming air, first heat exchanger means connected between said oxygen tank and said engine and utilizing said oxygen as the cooling medium, said first heat exchanger means being also connected to said air scoop to precool a second portion of said air, and second heat exchanger means connected between said oxygen tank and atmosphere and utilizing the cold nitrogen gas resulting from liquefaction of the oxygen in the air as the cooling medium, said second heat exchanger means being also connected with said air scoop to precool a third portion of said air, means for connecting said second heat exchanger with the three portions of precooled air in order to liquify the oxygen in the precooled air, and means for connecting said second heat exchanger with said oxygen tank to discharge the liquid oxygen and nitrogen gas to said oxygen tank.

2. A method of producing liquid oxygen from air, comprising liquefying the oxygen in said air by means of a low temperature substance stored in liquid form at a temperature below that of the liquified oxygen, and precooling separate portions of said air in three separate heat exchanger zones prior to said liquefaction process by direction said low temperature substance discharged from the liquefaction process to one of said zones, directing liquid oxygen to another of said zones and directing nitrogen gas resulting from the liquefaction process to the third zone.

3. A method of producing liquid oxygen from air, comprising the steps of collecting the air from the atmosphere, liquefying the oxygen in said air by means of a low temperature liquid fuel at a temperature below that of the liquified oxygen, precooling three separate portions of said air in three separate heat exchange zones prior to said liquefaction step and supplying one of said zones solely with the low temperature fuel discharged from the liquefaction step, another of said zones solely with oxygen resulting from the liquefaction step and another of said zones solely with other gases resulting from the liquefaction step.

4. A method as defined in claim 3 including the step of introducing the air to the liquefaction and precooling steps at atmospheric pressure.

5. A method of producing liquid oxygen from atmospheric air for use as an oxidant for hydrogen fuel, comprising continually collecting air from the atmosphere, directing a stream of low temperature liquid hydrogen to first heat exchanger means to liquify the oxygen in the incoming air, collecting the liquefied oxygen, precooling the incoming air prior to the liquefaction process in second heat exchanger means, supplying the second heat exchanger means with the hydrogen discharged from said first heat exchanger means and with the oxygen and other gases resulting from the liquefaction process for use as cooling medium, and supplying the hydrogen and oxygen discharged from said second heat exchanger means to a work extraction means wherein said hydrogen and oxygen are combusted to develop power.

6. A method of producing liquid oxygen from air for use as an oxidant for hydrogen fuel, comprising directing a stream of low temperature liquid hydrogen to heat exchanger means to liquify the oxygen in the incoming air, discharging the hydrogen from said heat exchanger means to a heat exchanger zone to precool a portion of the incoming air prior to liquefaction of the oxygen, supplying the oxygen resulting from the liquefaction process to a second heat exchanger zone to precool another portion of incoming air prior to liquefaction of the oxygen, supplying the other gases resulting from the liquefaction process to a third heat exchanger zone to precool another portion of incoming air prior to the liquefaction of the oxygen, and supplying the hydrogen and oxygen discharged from said separate heat exchange zones to a power developing means.

7. A device for producing liquid oxygen from air comprising a tank for storing liquid having a temperature below that of the produced liquid oxygen, an airscoop for obtaining a supply of air from the atmosphere, first heat exchange means directly connected with said airscoop for precooling said air and second heat exchanger means for liquefying the oxygen in said precooled air, means for connecting said second heat exchanger means with said first heat exchanger means to receive the precooled air discharged from said first heat exchanger means, and means for connecting said second heat exchange means with said tank to provide a cooling medium for liquefying the oxygen in said precooled air, said first heat exchanger means comprising three separate heat exchangers separately connected with said airscoop to receive and precool separate portions of said air, and means for supplying each of said heat exchangers with a cooling medium by connecting one of said heat exchangers with the liquid oxygen discharged from said second heat exchanger means, another of said heat exchangers with the nitrogen gas discharged from said second heat exchanger means and another of said heat exchangers with the cooling medium discharged from said second heat exchange means.

8. A device as defined in claim 7 having a compressor positioned in the connecting means between said first and second heat exchanger means for increasing the pressure of said precooled air and the liquefaction temperature of the oxygen in the air introduced to said second heat exchanger means.

9. A device for producing liquid oxygen from atmospheric air for use as an oxidant for an engine comprising means for obtaining a supply of air from the atmosphere, a first tank for housing a low temperature liquid fuel having a temperature below that of the produced liquid oxygen, a second tank for receiving the produced liquid oxygen, a first heat exchanger connected between said second tank and said engine and with a first portion of said air for precooling said first portion with said oxygen, a second heat exchanger connected between said second tank and atmosphere and with a second portion of said air for precooling said second portion with cold nitrogen gas resulting from the liquefaction of oxygen, third and fourth heat exchangers connected in series between said first tank and said engine, said fourth heat exchanger being connected with a third portion of said air for precooling said third portion with the fuel discharged from said third heat exchanger, means for connecting said third heat exchanger with all three portions of said precooled air for liquefying the oxygen in the precooled air with fuel from said tank, and means for connecting said third heat exchanger with said second tank for discharging said liquid oxygen and nitrogen gas to said second tank.

10. A method of producing liquid oxygen for use as an oxidant supply for a vehicle engine which utilizes a supply of low temperature liquid hydrogen as fuel comprising the steps of continually collecting air from the atmosphere, passing a stream of low temperature hydrogen from said supply to first heat exchanger means to liquefy the oxygen in the incoming air, precooling the incoming air prior to the liquefaction process in second heat exchanger means, supplying the second heat exchanger means with cooling medium consisting of the hydrogen discharged from said first heat exchanger means and the oxygen and nitrogen gas resulting from the liquefaction process, and supplying the hydrogen and oxygen discharged from said second heat exchanger means to said engine at about ambient atmospheric temperature.

11. A method of producing liquid oxygen for use as an oxidant for hydrogen fuel stored in the liquid state, comprising the steps of collecting atmospheric air, introducing the air directly to first heat exchanger means having three separate heat exchanger zones for precooling three separate portions of the collected air, discharging all of the air from the three heat exchanger zones to a second heat exchanger means to liquefy the oxygen component of the precooled air, supplying the hydrogen fuel to the second heat exchanger means as the cooling medium, discharging the fuel from the second heat exchanger means to one of the heat exchanger zones for use as a cooling medium having about the temperature of the produced liquid oxygen, supplying the produced oxygen to another of said heat exchanger zones for use as a cooling medium, and supplying gaseous nitrogen remaining after liquefaction of the oxygen to the third of the heat exchanger zones for use as a cooling medium having about the temperature of the produced liquid oxygen, the precooled air being introduced to the second heat exchanger means at about the temperature of the produced liquid oxygen.

12. A method as defined in claim 11 including the step of increasing the pressure of the precooled air prior to introduction into the second heat exchanger means to raise the liquefaction temperature of the oxygen in the air.

References Cited in the file of this patent

UNITED STATES PATENTS

| | | |
|---|---|---|
| 2,514,391 | Haynes | July 11, 1950 |
| 2,628,473 | Frye | Feb. 17, 1953 |
| 2,664,719 | Rice | Jan. 5, 1954 |
| 2,685,180 | Schlitt | Aug. 3, 1954 |
| 2,685,181 | Schlitt | Aug. 3, 1954 |
| 2,699,047 | Karwat | Jan. 11, 1955 |
| 2,769,304 | Burton | Nov. 6, 1956 |